US011016723B2

(12) United States Patent
Smith et al.

(10) Patent No.: US 11,016,723 B2
(45) Date of Patent: May 25, 2021

(54) MULTI-APPLICATION CONTROL OF AUGMENTED REALITY AUDIO

(71) Applicant: Bose Corporation, Framingham, MA (US)

(72) Inventors: Matthew Christopher Smith, Needham Heights, MA (US); Ilissa Brooke Bruser, Framingham, MA (US); Maya Antara Mukhopadhaya, Brookline, MA (US); DonPaul Nogueira, Southborough, MA (US); Todd Richard Reily, North Reading, MA (US)

(73) Assignee: BOSE CORPORATION, Framingham, MA (US)

( * ) Notice: Subject to any disclaimer, the term of this patent is extended or adjusted under 35 U.S.C. 154(b) by 6 days.

(21) Appl. No.: 16/511,375

(22) Filed: Jul. 15, 2019

(65) Prior Publication Data

US 2021/0019108 A1    Jan. 21, 2021

(51) Int. Cl.
*G06F 3/16* (2006.01)
*H04R 1/10* (2006.01)

(52) U.S. Cl.
CPC ........... *G06F 3/165* (2013.01); *H04R 1/1041* (2013.01)

(58) Field of Classification Search
CPC .............................. G06F 3/165; H04R 1/1041
USPC ................................................. 381/56, 58, 74
See application file for complete search history.

(56) References Cited

U.S. PATENT DOCUMENTS

| | | | |
|---|---|---|---|
| 9,171,546 B1 * | 10/2015 | Pike | ........................ H04M 3/50 |
| 9,451,584 B1 | 9/2016 | Cosenza et al. | |
| 2013/0194164 A1 | 8/2013 | Sugden et al. | |
| 2015/0208166 A1 | 7/2015 | Raghuvanshi et al. | |
| 2015/0230022 A1 * | 8/2015 | Sakai | ................... H04R 1/1041 |
| | | | 381/58 |
| 2016/0286316 A1 | 9/2016 | Bleacher et al. | |
| 2019/0066630 A1 * | 2/2019 | Fukazawa | .......... G02B 27/0172 |
| 2019/0246235 A1 | 8/2019 | Bruser et al. | |
| 2019/0281389 A1 | 9/2019 | Gordon et al. | |
| 2020/0103521 A1 * | 4/2020 | Chiarella | ................ G01S 13/93 |
| 2020/0218824 A1 | 7/2020 | Chu et al. | |

* cited by examiner

*Primary Examiner* — William A Jerez Lora
(74) *Attorney, Agent, or Firm* — Hoffman Warnick LLC

(57) ABSTRACT

Various implementations include audio devices and related computer-implemented methods for controlling playback of augmented reality (AR) audio. Certain implementations include approaches for managing audio notifications at an audio device according to a set of audio notification rules, for example, by delaying release of notifications and/or de-prioritizing notifications based upon the rules.

16 Claims, 3 Drawing Sheets

MULTI-APPLICATION CONTROL OF AUGMENTED REALITY AUDIO

TECHNICAL FIELD

This disclosure generally relates to augmented reality (AR) audio control. More particularly, the disclosure relates to audio devices and related methods for prioritizing AR audio notifications based upon one or more detected conditions.

BACKGROUND

Portable electronic devices, including headphones, audio eyeglasses and other wearable audio systems are becoming more commonplace. These portable electronic devices can enable immersive user experiences, for example, using audio to augment the user's perception of the surrounding world and aid in performing a number of tasks. However, these conventional systems fail to capitalize on the various benefits that augmented audio can provide.

SUMMARY

All examples and features mentioned below can be combined in any technically possible way.

Various implementations include audio devices and related computer-implemented methods for controlling playback of augmented reality (AR) audio. Certain implementations include approaches for controlling AR audio playback from distinct applications at a wearable device. Additional implementations include a wearable audio device with a control system for controlling AR audio playback from distinct applications.

In some particular aspects, a computer-implemented method of controlling playback of augmented reality (AR) audio from distinct applications at a wearable audio device includes: running a control application at the wearable audio device or a smart device connected with the wearable audio device, the control application running as a gateway for notifications from the distinct applications; releasing a first audio notification at the wearable audio device based upon a set of audio notification rules for the distinct applications; and releasing a second audio notification at the wearable audio device, after the first audio notification, based upon the set of audio notification rules, where the first audio notification is received from a first one of the distinct applications, and the second audio notification is received from a second one of the distinct applications, and where the control application controls release of the first audio notification and the second audio notification based upon the set of audio notification rules.

In other particular aspects, a wearable audio device includes: an acoustic transducer having a sound-radiating surface for providing an audio output; and a control system coupled with the acoustic transducer, the control system configured to control playback of augmented reality (AR) audio from distinct applications at the acoustic transducer by performing actions including: running a control application as a gateway for notifications from the distinct applications; releasing a first audio notification as playback at the acoustic transducer based upon a set of audio notification rules for the distinct applications; and releasing a second audio notification as playback at the acoustic transducer, after the first audio notification, based upon the set of audio notification rules, where the first audio notification is received from a first one of the distinct applications, and the second audio notification is received from a second one of the distinct applications, and where the control application controls release of the first audio notification and the second audio notification based upon the set of audio notification rules.

Implementations may include one of the following features, or any combination thereof.

In some cases, the first audio notification is received from the first application after the second audio notification is received from the second application.

In particular implementations, the audio notification rules are dictated by one or more of: a location of the wearable audio device, an orientation of the wearable audio device, a relative proximity of the wearable audio device to another wearable audio device, a detected biometric indicator about a user of the wearable audio device, a task list for the user of the wearable audio device or a current time of day.

In certain aspects, the method further includes modifying an audio playback characteristic of at least one of the first audio notification or the second audio notification based upon the set of audio notification rules.

In particular cases, modifying the audio playback characteristic of at least one of the first audio notification or the second audio notification includes at least one of: prepending a tone indicating the audio notification, adjusting a pitch of the audio notification, adjusting a spatialized audio characteristic of the audio notification or initiating a haptic marker prior to playback of the audio notification, where modifying the audio playback characteristic of at least one of the first audio notification or the second audio notification provides a contextual cue for a user of the wearable audio device about the first audio notification or the second audio notification.

In some implementations, the method further includes: receiving a user command defining a noise management feature of the wearable audio device; and enabling the noise management feature in response to the user command.

In certain cases, the noise management feature is enabled while the control application is running.

In particular aspects, the noise management feature includes at least one of: aware mode, augmented hearing mode, active noise reduction (ANR) mode or controllable noise cancellation (CNC) mode.

In some cases, the set of audio notification rules includes a hierarchical data structure indicating: a) one or more scenarios whereby an earlier received audio notification is released after a later received audio notification, or b) one or more scenarios whereby a received audio notification is released on a delay.

In certain aspects, the distinct applications are run in a background state at the wearable audio device or the smart device while the control application is running.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
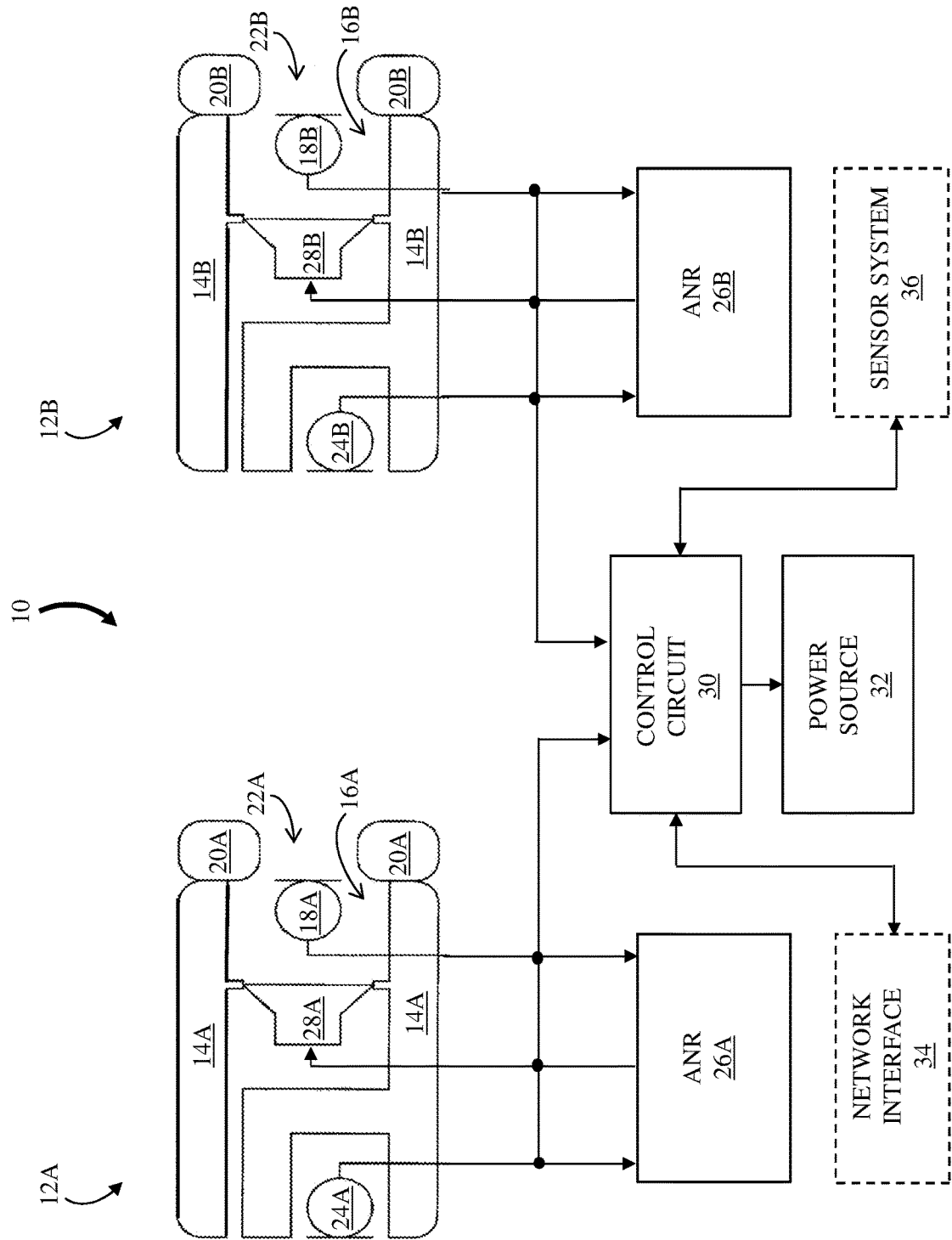
FIG. 1 is a schematic depiction of an example audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that multiple applications can be managed in an augmented audio environment based upon one or more audio notification rules. In certain implementations, the audio notification rules include a hierarchical data structure that indicates one or more scenarios whereby an earlier received audio notification is released after a later received audio notification, or one or more scenarios whereby a received audio notification is released on a delay.

Additional aspects of managing multi-application augmented reality audio notifications are described in co-pending U.S. patent application Ser. No. 16/511,381, entitled, "Multi-Application Augmented Reality Audio with Contextually Aware Notifications", filed concurrently herewith on Jul. 15, 2019 and incorporated by reference in its entirety.

Commonly labeled components in the FIGURES are considered to be substantially equivalent components for the purposes of illustration, and redundant discussion of those components is omitted for clarity.

Aspects and implementations disclosed herein may be applicable to a wide variety of personal audio devices, such as a portable speaker, headphones, and wearable audio devices in various form factors, such as watches, glasses, neck-worn speakers, helmets with integrated speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses, headphones, earphones or other head-mounted audio devices (e.g., helmets with integrated speakers). It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

Audio Device

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device (or simply, audio device) 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The audio device 10 also includes a power source 32. The control circuit 30 and power source 32 may be in one or both of the earpieces 12 or may be in a separate housing in communication with the earpieces 12. The audio device 10 may also include a network interface 34 to provide communication between the audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from audio device 10. The network interface 34 can provide for communication between the audio device 10, audio sources and/or other networked (e.g., wireless) speaker packages and/or other audio playback devices via one or more communications protocols. The network interface 34 may provide either or both of a wireless interface and a wired interface. The wireless interface can allow the audio device 10 to communicate wirelessly with other devices in accordance with any communication protocol noted herein. In some particular cases, a wired interface can be used to provide network interface functions via a wired (e.g., Ethernet) connection.

Additional description of the control circuit 30 (e.g., including memory and processing function), network interface 34 (e.g., including network media processor functions) and other features of the audio device 10 can be found in U.S. patent application Ser. No. 16/179,205 ("Spatialized Virtual Personal Assistant"), filed on Nov. 2, 2018, which is herein incorporated by reference in its entirety.

As shown in FIG. 1, audio device 10 can also include a sensor system 36 coupled with control circuit 30 for detecting one or more conditions of the environment proximate audio device 10. Sensor system 36 can include inner microphones 18 and/or outer microphones 24, sensors for detecting inertial conditions at the audio device 10 and/or conditions of the environment proximate audio device 10 as described herein. The sensors may be on-board the audio device 10, or may be remote or otherwise wireless (or hard-wired) connected to the audio device 10. As described further herein, sensor system 36 can include a plurality of distinct sensor types for detecting inertial information, environmental information, or commands at the audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers gyroscopes and/or magnetometers. In some particular implementations, sensor system 36 can one or more inertial measurement units (IMUs) having three-dimensional (3D) accelerometers, gyroscopes and a magnetometer. Additionally, in various implementations, the sensor system 36 can include a barometer for detecting elevation via pressure readings, e.g., for locating the audio device 10 vertically, such as in a tall building or underground. The sensor system 36 can further include one or more biometric sensors for detecting biometric indicators about the user of the audio device 10 and/or location/proximity sensors for detecting a location of the audio device 10 and/or a relative proximity of the audio device 10 to another audio device.

In various implementations, the sensor system 36 can be located at the audio device 10, e.g., where an IMU is physically housed in the audio device 10. In some examples, the sensor system 36 (e.g., including the IMU) is configured to detect a position, or a change in position, of the audio device 10. This inertial information can be used to control various functions described herein. For example, the inertial information can be used to trigger a command function, such as activating an operating mode of the audio device 10 (e.g., multi-application AR audio mode), modify playback of an audio file, or suggest a distinct audio file for playback during an operating mode.

The sensor system 36 can also include one or more interface(s) for receiving commands at the audio device 10. For example, sensor system 36 can include an interface permitting a user to initiate functions of the audio device 10. In a particular example implementation, the sensor system 36 can include, or be coupled with, a capacitive touch interface for receiving tactile commands on the audio device 10.

In other implementations, as illustrated in the phantom depiction in FIG. 1, one or more portions of the sensor system 36 can be located at another device capable of indicating inertial, location, or other information about the user of the audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where audio device 10 includes headphones and an IMU is located in a pair of glasses, a watch or other wearable electronic device.

Data Flow

Figure 2:
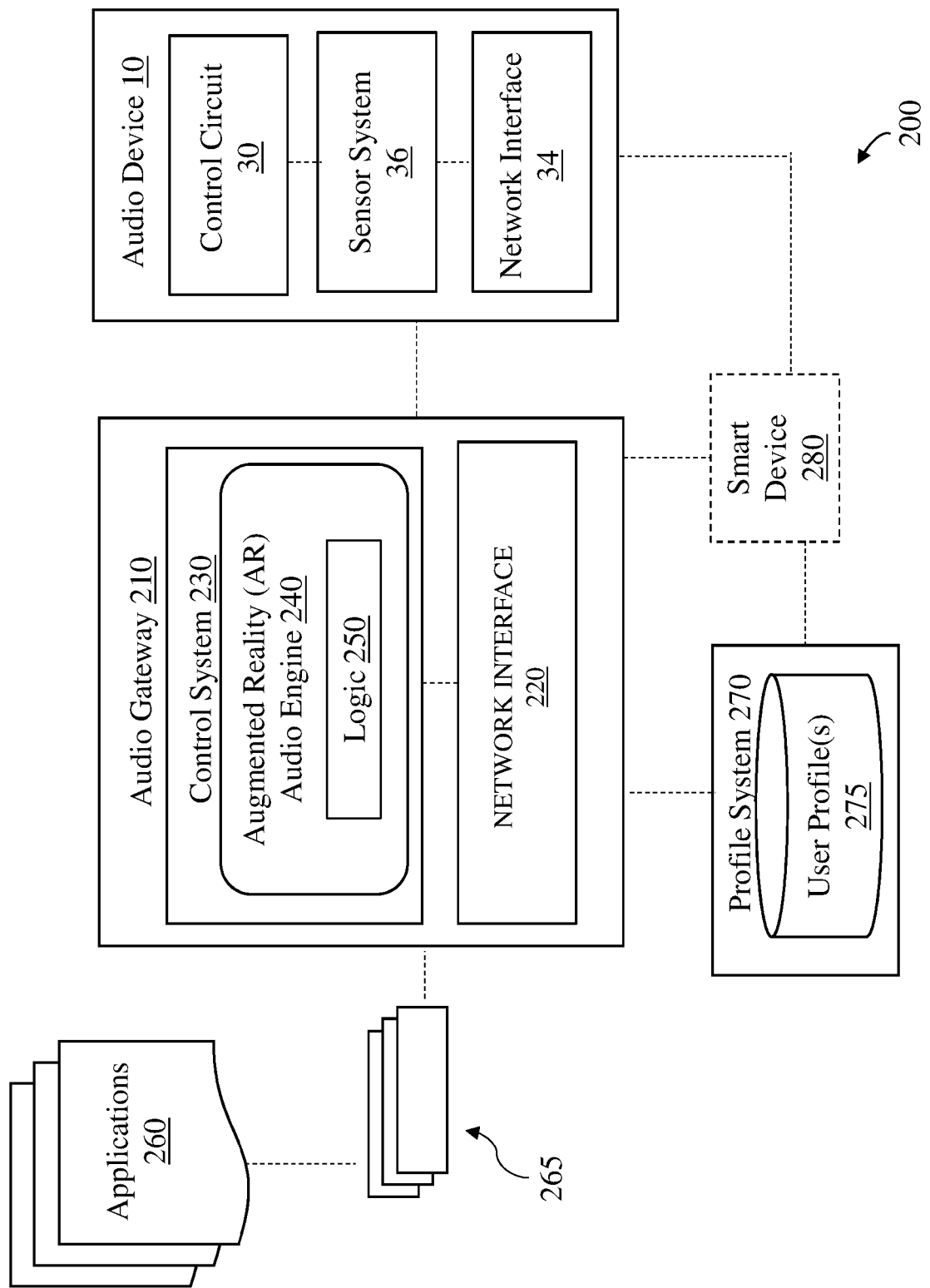
FIG. 2 is data flow diagram illustrating interaction between devices running an augmented reality audio engine in an environment according to various implementations.

As described with respect to FIG. 1, control circuit 30 can execute (and in some cases store) instructions for controlling AR audio functions in audio device 10 and/or other audio playback devices in a network of such devices. FIG. 2 shows a schematic depiction of data flows in a system 200 including the personal audio device (or simply, audio device) 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include similar network interface components as described with reference to the network interface 34 of audio device 10, e.g., a wireless transceiver configured to communicate over any wireless protocol described herein.

Audio gateway 210 can further include a control system 230 configured to execute control functions in the multi-application AR audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide augmented reality (AR) audio functions described herein.

In particular implementations, control system 230 includes an augmented reality (AR) audio engine 240 or otherwise accesses program code for executing processes performed by AR audio engine 240 (e.g., via network interface 220). AR audio engine 240 can include logic 250 for executing functions described herein. Both audio gateway 210 and audio device 10 are shown in simplified form in FIG. 2 to focus illustration on functions described according to the AR audio engine 240. AR audio engine 240 can be configured to implement audio modifications in audio outputs at the transducer (e.g., speaker) 28 (FIG. 1) of the audio device 10 based upon audio notification rules, and/or in response to receiving a command from a user (e.g., via one or more microphones in the sensor system 36 or in a paired smart device). In various particular embodiments, AR audio engine 240 is configured to receive audio notification data from a plurality of applications, check that audio notification data against a set of audio notification rules, and instruct the control circuit 30 at the audio device 10 to initiate playback of AR audio (e.g., one or more notifications) at the transducer(s) 28 (FIG. 1) according to the set of rules. In particular cases, the AR audio includes a notification from one of a plurality of distinct applications running, e.g., via the audio gateway 210 and/or the audio device 10. The AR audio engine 240 is configured to release audio notifications as audio output at the audio device 10 according to the audio notification rules, for example, in an order different from the order in which the notifications were received, and/or on a delay.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations.

In various implementations, the AR audio engine 240 is connected (e.g., via the audio gateway 210) with a set of applications 260, which may run locally at a given device (e.g., audio device 10 and/or smart device 280), or may be running in a cloud-based system (server) connected with that device. The AR audio engine 240 is also connected with a profile system 270 including user profiles 275. In additional implementations, the AR audio engine 240 can also be connected with a smart device 280.

In various implementations, the AR audio engine 240 runs as a control application at the audio device 10, audio gateway 210 and/or smart device 280 for notifications from the distinct (software) applications 260. In still further implementations, the AR audio engine 240 can run as a control application at a cloud-based or other distributed computing system (server), such as in the case that the distinct software applications 260 are run at the same or a similar system. The AR audio engine 240 can run continuously for a period, e.g., when enabled, in order to act as a gateway for notifications 265 from those distinct applications 260. The distinct applications 260 are independent of one another, and are configured to provide notifications 265 such as user interface notifications (e.g., audio notifications, visual notifications, tactile or haptic notifications, etc.) based upon one or more conditions. For example, the distinct applications can include a calendar application providing reminders about upcoming events, an audio streaming application providing notifications about available content, a communications application providing notifications about incoming phone calls or video calls, a health monitoring application providing notifications about vital signs and/or recommending increases, decreases or other modifications to activity level based upon the vital signs, a safety monitoring application providing notifications about unsafe or otherwise hazardous areas or conditions, etc.

In particular implementations, the logic 250 in AR audio engine 240 is configured to process sensor data, contextual data, and/or user input data from the audio device 10 and/or additional sources (e.g., smart device 280, profile system 270, etc.) and execute various control functions. For example, the AR audio engine 240 is configured to receive sensor data from the sensor system 36, data from one or more applications running at the audio gateway 210 and/or the smart device 280 and/or user profile data (e.g., from profile system 270). In various implementations, the AR audio engine 240 is also configured to receive commands from a user (e.g., via one or more interfaces and/or sensors described herein, such as interfaces and/or sensors in sensor system 36 and/or a separate smart device 280). In response to determining which audio notification should be released, and at what time, the AR audio engine 240 can initiate playback (e.g., via transducer(s) 28 at audio device 10) of the audio notification(s) 265 according to the rules.

AR audio engine 240 (including logic 250, related software and/or hardware) can be located at the audio device 10, audio gateway 210 or any other device described herein (e.g., smart device 280). That is, AR audio engine 240 can be configured to execute functions at one or more devices and/or components described herein. In some cases, the AR audio engine 240 may take the form of an entirely hardware implementation, an entirely software implementation (including firmware, resident software, micro-code, etc.) or an implementation combining software and hardware aspects that may all generally be referred to herein as an "engine." Additionally, the AR audio engine 240 may take the form of a computer program product embodied in any tangible medium of expression having computer-usable program code embodied in the medium. In various particular implementations, the AR audio engine 240 executes functions described herein according to logic 250, which can be stored or otherwise accessed by any device capable of performing those functions, e.g., audio gateway 210, audio device 10 or other device(s) described herein.

User profiles 275 may be user-specific, community-specific, device-specific, location-specific or otherwise associated with a particular entity such as the user. User profiles 275 can include user-defined playlists of digital music files, audio messages stored by the user of audio device 10, or another user, or other audio content available from network audio sources coupled with network interfaces 34 and/or 220, such as network-attached storage (NAS) devices, and/or a DLNA server, which may be accessible to the audio gateway 210 and/or audio device 10 over a local area network such as a wireless (e.g., Wi-Fi) or wired (e.g., Ethernet) home network, as well as Internet music services such as Pandora®, vTuner®, Spotify®, etc., which are accessible to the audio gateway 210 and/or audio device 10 over a wide area network such as the Internet. In some cases, profile system 270 is located in a local server, or a cloud-based server, similar to any such server described herein. User profile 275 may include information about frequently played audio content associated with the user of audio device 10 or other similar users (e.g., those with common audio content listening histories, demographic traits or Internet browsing histories), "liked" or otherwise favored audio content associated with the user or other similar users, frequency with which particular audio content is changed by the user or other similar users, etc. Profile system 270 can be associated with any community of users, e.g., a social network, subscription-based music service (such as a service providing an audio library), and may include audio preferences, histories, etc. for the user as well as a plurality of other users. In particular implementations, profile system 270 can include user-specific preferences (as profiles 275) for messages and/or related notifications (e.g., prompts, audio overlays). Profiles 275 can be customized according to particular user preferences, or can be shared by users with common attributes.

In addition to the profile system 270, the AR audio engine 240 can additionally be coupled (e.g., wirelessly and/or via hardwired connections in personal audio device 10) with an audio library (not shown), which can include audio content (e.g., audio file(s), playlist(s) of audio files, podcast(s), an audio stream or an Internet radio station, location-specific audio pins, condition-specific audio files and/or streams, or one or more audibly presented selections) for playback (e.g., streaming or otherwise rendering) at audio device 10. The audio library can include any library associated with digital audio sources accessible via network interfaces 34 and/or 220 described herein, including locally stored, remotely stored or Internet-based audio libraries. While the audio library profile system 270 and audio library can be located at one or more remote devices, e.g., in a cloud-based system or at a remote storage device, it is understood that the profile system 270 and/or audio library could be integrated in any of the devices shown and described in FIG. 2, e.g., at the audio device 10, audio gateway 210 and/or smart device(s) 280.

As shown herein, AR audio engine 240 can also be coupled with a separate smart device 280. The smart device 280 is shown in phantom because it may be a separate component from the device executing the AR audio engine 240, however, it is understood that in various implementations, the audio gateway 210 is located at a smart device 280 (e.g., a smart phone, smart wearable device, etc.). The AR audio engine 240 can have access to a user profile (e.g., profile 275) and/or biometric information about the user of audio device 10. In some cases, the AR audio engine 240 directly accesses the user profile and biometric information, however, in other cases, the AR audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. However, as noted herein, in some cases the audio gateway 210 is located at a smart device such as the smart device 280.

In some example implementations, smart device 280 can be utilized for: connecting audio device 10 to a Wi-Fi network; creating a system account for the user; setting up music and/or location-based audio services; browsing of content for playback; setting preset assignments on the audio device 10 or other audio playback devices; transport control (e.g., play/pause, fast forward/rewind, etc.) for the audio device 10; and selecting one or more audio devices 10 for content playback. Smart device 280 can further include embedded sensors for measuring biometric information about a user, e.g., travel, sleep or exercise patterns; body temperature; heart rate; or pace of gait (e.g., via accelerometer(s)). In various implementations, one or more functions of the AR audio engine 240 can be executed at smart device 280. Further, it is understood that audio gateway 210 can include any manner of smart device described herein.

As described herein, AR audio engine 240 is configured to receive sensor data about one or more conditions at the audio device 10 from sensor system 36. In various particular implementations, the sensor system 36 can include an IMU for providing inertial information about the audio device 10 to the AR audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the AR audio engine 240, including logic 250, is configured to calculate spatially rendered audio locations proximate the audio device for audio output using inputs such as audio pin angle, IMU azimuth angle and persistent azimuth, as described in U.S. Pat. No. 10,194,259, which is hereby incorporated by reference in its entirety.

In additional implementations, sensor system 36 can include additional sensors for detecting conditions at the audio device 10, for example: a position tracking system; and a microphone (e.g., including one or more microphones). It is understood that any number of additional sensors can be incorporated in sensor system 36, and can include temperature sensors or humidity sensors for detecting changes in weather within environments, physiological sensors for detecting physiological conditions of the user (e.g., one or more biometric sensors such as a heart rate sensor, a photoplethysmogram (PPG), electroencephalogram (EEG), electrocardiogram (ECG) or EGO) optical/laser-based sensors and/or vision systems for tracking movement/speed/acceleration, light sensors for detecting time of day, additional audio sensors (e.g., microphones) for detecting human or other user speech or ambient noise, etc. These sensors are merely examples of sensor types that may be employed according to various implementations. It is further understood that sensor system 36 can deploy these sensors in distinct locations and distinct sub-components in order to detect particular environmental information relevant to user of audio device 10. Additional details about specific sensor types and functions, along with actuation mechanisms and cues in the audio device 10 and/or smart device 280 can be found in U.S. patent application Ser. No. 16/179,205 ("Spatialized Virtual Personal Assistant"), previously incorporated by reference herein.

In additional implementations, the AR audio engine 240 can alternatively (or additionally) be configured to implement modifications in audio outputs at the transducer (e.g., speaker) 28 (FIG. 1) at audio device 10 in response to receiving additional information from audio device 10 or another connected device such as audio gateway 210 and/or smart device 280. For example, a Bluetooth beacon (e.g., BLE beacon) trigger, GPS location trigger or timer/alarm mechanism can be used in evaluating rules for providing notifications at audio device 10. These triggers and mechanisms can be used in conjunction with other actuation mechanisms described herein (e.g., application data-based actuation, timing-based actuation, weather data-based actuation, voice actuation, gesture actuation, tactile actuation) to control release of notifications. In some cases, notifications can be restricted, delayed or otherwise re-ordered based upon proximity to a detected BLE beacon or GPS location. In other particular cases, the notifications can be restricted, delayed or otherwise re-ordered based upon a timing mechanism, such as at particular times or intervals.

As additionally noted herein, the AR audio engine 240 can be configured to detect or otherwise retrieve contextual data about the user and/or usage of the audio device 10. For example, the AR audio engine 240 can be configured to retrieve contextual data from one or more applications running at the audio gateway 210 and/or the audio device 10, such as a calendar or organizational application, e-mail or messaging application, social media application, travel application, shopping application, fitness application, etc. The AR audio engine 240 can also be configured to detect that the user is engaging one or more device functions, for example, that the user is on a phone call or actively sending/receiving messages with another user using the audio gateway 210.

As described herein, in some implementations, the AR audio engine 240 can be configured to output audio notifications (as a subset of notifications 265) in spatialized form. In some cases, audio notifications can include a spatialized audio file configured for playback (which in some cases is binaural). In these cases, the spatialized audio file is configured for output at a spatially rendered audio location, or multiple spatially rendered audio locations, relative to the user. For example, the spatialized audio file can be configured for playback at one or more spatially rendered audio locations relative to the user's look direction (e.g., as detected by sensors at sensor system 36 and/or smart device 280), or relative to a physical location proximate the user. In other cases, the notification includes a monaural audio file, a stereo audio file, a spatialized audio file or a multichannel audio file. Application of spatialized audio functions in particular devices is further described in U.S. Pat. No. 10,194,259, previously incorporated by reference herein.

In particular cases, the (audio) notification 265 is output at the audio device 10 in a spatially rendered audio location that is defined relative to a look direction of the user (e.g., the user's head direction or eye focus direction) or relative to a physical location proximate the user. In additional particular implementations, the AR audio engine 240 outputs the audio notification according to an application setting, a location of the audio device 10, the look direction of the user, contextual information about what a user is doing, and/or a type of the playback condition data.

As noted herein, in various implementations, rules for releasing the notifications 265 can be settings-specific, location-specific, device-specific, time-specific, weather-specific, movement-specific, event-specific, specifically tailored to interaction with other users, or otherwise tailored to particular user experiences. In some cases, AR audio engine 240 presents a notification 265 to the user that is related to a particular location, e.g., when the user approaches that location, and can also present a notification 265 based upon the direction in which the user is facing (e.g., looking). For example, looking straight ahead, left or right can trigger the AR audio engine 240 to provide notifications 265 (in a spatially rendered audio location defined relative to the different look direction) indicating information (e.g., areas of interest) or other AR audio relevant to that look direction. In some directionally-specific cases, the notification 265 can include narrative audio such as introductory information about additional content associated with one or more look directions, e.g., as a sample.

Example Process Flow

Figure 3:
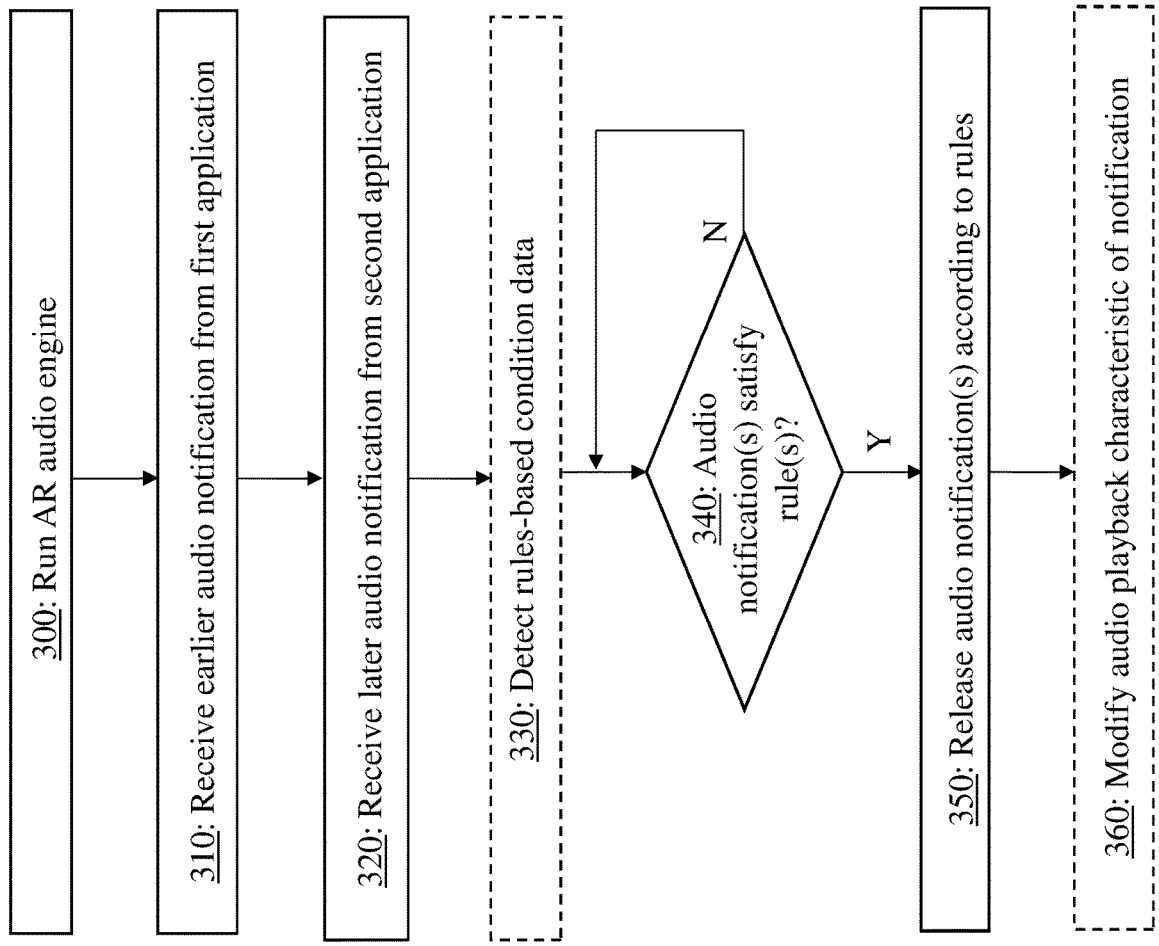
FIG. 3 is a flow diagram illustrating processes performed by the augmented reality audio engine shown in FIG. 2.

During operation, the AR audio engine 240 is configured to control playback of AR audio at the audio device 10 according to various rules. In particular implementations, the AR audio engine 240 is configured to act as a gateway for notifications 265 from distinct applications 260, releasing those notifications 265 according to a set of audio notification rules. FIG. 3 illustrates a general process flow in controlling AR audio notifications as performed by the AR audio engine 240. FIGS. 2 and 3 are referred to concurrently.

As shown, process 300 includes running the AR audio engine 240 (also referred to as a "control application") as a gateway for notifications 265 from distinct applications 260. In various implementations, the AR audio engine 240 is run (e.g., executed) at the audio device 10, audio gateway 210, smart device 280 and/or in a remote or distributed server such as a cloud-based server. In some cases, while the AR audio engine 240 is running, the other applications 260 providing notifications 265 are run in a background state.

As used herein, the term "notification" can refer to an update or information that is provided, for example, based upon default settings in an application and/or user-defined settings in that application. The "audio notifications" described herein can include audio playback of text-based notifications (e.g., via text-to-speech conversion) and/or playback of audio files or streams that are originally received by the AR audio engine 240 in an audio format. The AR audio engine 240 is configured to act as a gateway for both playback of audio notifications as well as release of notifications in other formats. However, in particular cases, the AR audio engine 240 is configured to control audio notifications 265, e.g., as output at the transducers 28 on audio device 10.

In various implementations, as illustrated in process 310 in FIG. 3, the AR audio engine 240 is configured to receive a notification 265A (earlier notification) from a first application 260A. In some examples, the notification 265A can include an update from a software application such as a social media application (e.g., a status update or news item such as, "Matthew has just posted a new photo", or "Ilissa shared a news story"). In other examples, the notification 265A can indicate an incoming message (e.g., "You have a message from Maya") from a messaging application or a phone call (e.g., "Donpaul is calling") via an audio gateway (e.g., audio gateway 210). The notification 265A can further include information about detected states of the audio device 10 and/or smart device 280, for example, that power is running low on one of these devices, or that the audio device 10 is in close proximity to an audio device associated with another user such as a friend or colleague. These are just several of the various notifications 265 that can be received from a plurality of applications 260.

At a time after receiving the notification 265A from the first application 260A, the AR audio engine 240 receives a notification 265B (later notification) from a second application 260B, as illustrated in process 320 in FIG. 3. Similar to the earlier notification 265A, the later-received notification 265B can be from any of the applications 260 described herein. However, in particular cases, the later-received notification 265B is from a distinct application 260B than the earlier-received notification 265A (received from application 260A). In various implementations, the AR audio engine 240 is configured to receive notifications 265 from several applications 260 or more within a given period, e.g., within a matter of minutes or hours.

In various implementations, the logic 250 in the AR audio engine 240 includes audio notification rules for controlling release of the notifications, e.g., notification 265A, 265B. In some cases, the audio notification rules include a hierarchical data structure that includes: a) one or more scenarios whereby an earlier received audio notification is released after a later received audio notification, or b) one or more scenarios whereby a received audio notification is released on a delay. In the first set of scenarios, an earlier received audio notification (e.g., notification 265A) is released for playback at the transducers 28 of the audio device 10 after a later received audio notification (e.g., notification 265B).

That is, the data structure defining these scenarios indicates that under certain conditions, an earlier received notification is released after a later received notification. In the second sect of scenarios, at least one of the received notifications (e.g., notification 265A and/or notification 265B) is released on a delay. That is, the data structure defining these scenarios indicates that under certain conditions, a received notification is released on a delay, e.g., a delay of seconds, minutes, hours, etc. The hierarchical data structure can include, e.g., a look-up table, an index table, etc. that includes relationships between rules-based inputs such as data from sensors, operating settings for the device (e.g., audio device 10), date/time information, calendar and/or task data, etc.

In additional implementations, a machine learning-based classifier is used for audio notification rules, for example, a classifier that is trained to identify whether a notification should be presented based upon input data available at a given time. In other implementations, audio notification rules can include a model that is configured to learn over time using various inputs, e.g., update device state given contextual data, update expected effects of a given notification rule, etc.

In some examples, the audio notification rules are updated over time according to detected user action. For example, location-based audio notification rules can be defined and/or refined based upon a number of times a user enters and/or exits a location over a period (e.g., has the user entered and exited a defined area X number of times in a period). In other examples, audio notification rules are updated based upon detected contextual data over time. For example, audio notification rules can be defined and/or refined based upon the user reaction to prior notifications (e.g., warning notifications), e.g., by consistently ignoring such notifications or only taking action in response to notifications in a particular format. Additional contextual data, as described herein, can be used to define and/or refine these rules.

In various implementations, the AR audio engine 240 is executed as a software application configured to receive data from one or more systems and/or applications on the audio device 10, audio gateway 210 and/or smart device 280. As noted herein, the AR audio engine 240 can also access user profiles 275, which can include playback condition thresholds or other standards specific to the user. In some examples, the AR audio engine 240 can be configured to receive application execution data from an application running at the audio device 10, audio gateway 210 or the smart device 280. The application execution data can be received from one or more applications, e.g., a fitness application, a navigation application, a social media application, a news application, or a streaming music application.

The AR audio engine 240 can additionally, or alternatively, receive sensor data from the sensor system 36, e.g., IMU data, GPS data, voice signature data. In some optional implementations, as illustrated in process 330 (shown in phantom), the AR audio engine 240 detects rules-based condition data, such as data about user orientation from an IMU or optical sensor in the sensor system 36, or a biometric indicator of the user's heart rate or activity level from a biometric sensor in the sensor system 36.

The AR audio engine 240, in decision 340, compares that application execution data and/or sensor data with a corresponding rule (or, threshold such as a value or a range) that is attributable to the user, a group of users including the users, or a default setting e.g., as stored in the user profile 275 or otherwise accessible through the AR audio engine 240. If the notification 265 satisfies the applicable rule(s), the audio notification 265 is released for playback at the transducers (e.g., transducer 28 at audio device 10), as shown in process 350.

If the notification 265 does not satisfy the applicable rule(s), the AR audio engine 240 checks the notification 265 against the rules again, e.g., iteratively or until the notification becomes stale or times out (looping back to decision 340). In some cases, the rules-based condition data is updated over time, e.g., as the date and time change, calendar events change, physiological conditions of the user change, use context changes (e.g., from work use to personal use), etc. As such, a notification 265 that is de-prioritized or otherwise delayed based upon a transient rules-based condition can later satisfy that rule and be released for playback. In this sense, where a notification 265 is not released for playback, that notification 265 can be re-checked against updated rules-based condition data.

In the examples described herein, the option to designate superseding or subsequent AR audio playback in settings (e.g., profile settings or otherwise accessible settings for the AR audio engine 240), may allow the user to control unwanted intrusions from the audio device 10. That is, the user can define settings to tailor AR audio according to his/her lifestyle and desire for interactive audio experiences. While certain users may wish to receive information (e.g., notifications 265 and/or related prompts) related to a number of applications, other users may define settings that prevent frequent or lower-priority notifications or prompts in order to avoid interrupting playback of the current AR audio at the audio device 10, or interference with his/her current activity.

Example Audio Notification Rules

In various implementations, as noted herein, the AR audio engine 240 is configured to manage AR audio notifications 265 according to one or more rules, e.g., user-defined rules for prioritizing one or more types of notifications 265 or types of applications releasing notifications 265 over others, limiting a number of notification-based audio interruptions in a given period or within a given geographic range and/or limiting notifications 265 when multiple AR audio notifications 265 are available. These user-defined preferences can be referred to as "tags" in some cases. While the AR audio engine 240 is configured to provide responsive, immersive audio experiences in a variety of environments, the AR audio engine 240 is also configurable to minimize intrusion into the user's other auditory experiences.

In various particular implementations, the audio notification rules are dictated by conditions relating to one or more of: i) a location of the audio device 10, ii) an orientation of the audio device 10, iii) a relative proximity of the audio device 10 to another audio device 10, iv) a detected biometric indicator about a user of the audio device 10, v) a task list for the user of the audio device 10, or vi) a current time of day. These are merely some examples of conditions that can define the audio notification rules according to the various implementations. Additionally, as noted herein, these conditions may be combined in any way to further define rules for audio notifications, e.g., where location and orientation define a particular rule, or where relative proximity to another wearable audio device and a current time of day define another rule. These examples are described in further detail below.

I) Location of the audio device 10. In various examples, AR audio notification rules partially rely upon a known location of the audio device 10. In certain cases, the rules are directly connected with a particular geographic location (e.g., a user's office or home). In other cases, the location-based rules are not directly connected with a particular location. In some examples, the AR audio engine 240 is configured to determine that the user is located at his/her office (e.g., using location data from sensor system 36), and delay audio notifications from sources unrelated to the office (e.g., social media application notifications or personal phone call notifications) until the user's location changes, and/or until a particular time of day such as the lunch hour. In other cases, the rules define scenarios whereby the detected geographic location causes the AR audio engine 240 to release a later-received notification 265 (e.g., "You have a new email from your boss" or, "Your new office supplies have been delivered") prior to an earlier-received notification 265 (e.g., "You have a new text message from your brother" or, "Your friend updated her social media picture"). These location-based rules can be defined in terms of absolute location of the audio device 10 (e.g., user is at his/her office or home), location patterns, and/or relative locations with respect to people or places.

In some cases, location-based rules can use location pattern data about a common travel pattern for the user. In these cases, the AR audio engine 240 is configured to detect that the audio device 10 (and implicitly, the user) is travelling along a common travel pattern. For example, the AR audio engine 240 can receive location pattern data from a travel application or other location tracking application running on the audio device 10, audio gateway 210 and/or smart device 280 that indicates the audio device 10 is at a location associated with a common travel pattern for the user. For example, the travel or location-based application can detect that the user walks to the same train station on weekdays to commute to his/her office. This application can detect locations along that travel pattern (e.g., travel route), and when the audio device 10 intersects one or more of those locations, can send a notification to the AR audio engine 240 indicating that the user is possibly on a common travel pattern. The AR audio engine 240 can apply rules related to that travel pattern, e.g., releasing or otherwise prioritizing audio notifications relating to the user's work (e.g., email notifications) while he/she is commuting to the office, and/or releasing or otherwise prioritizing audio notifications audio notifications relating to the user's health/fitness while the user is on his/her regular bicycling route.

In additional cases, location-based rules can use location pattern data about popular or common travel patterns for a group of users, e.g., a demographically common group of users, a group of users working for the same employer or in the same job title, or a group of users within a network such as a social network. This approach may utilize travel and/or location pattern data for a plurality of users, such as where the user is located at a highly trafficked location or a location commonly traveled through/to by a plurality of users, and can control delay and/or reordering of notifications 265 to the audio device 10 as relevant to that location. In these cases, the AR audio engine 240 can store or otherwise access data indicating that a location is on a popular travel route or pattern, e.g., a location on the Freedom Trail in Boston, a public transit stop such as the Fenway or Yawkey stops near Fenway Park in Boston, a location in a production facility where machine operators commonly stand while performing tasks, etc. Where the AR audio engine 240 detects that that the audio device 10 intersects a location on this popular travel route (e.g., via location application, GPS data, or other location tracking described herein), the AR audio engine 240 can apply rules to delay or re-order release of received notifications 265 from distinct applications 260. For example, the AR audio engine 240 can prioritize notifications from a travel guide application (e.g., where the audio device 10 is determined to be located on a popular travel route such as the Freedom Trail) or from a workplace instructional application (e.g., where the audio device 10 is determined to be located at a workstation), and/or delay release of notifications from applications such as social media applications or non-urgent messages from any messaging application (e.g., where the audio device 10 is located at a workstation during working hours). In various examples, the popular travel route can include stations in a working environment, an exercise route such as a walking or bicycling path, a tour route (e.g., a tour of a neighborhood or a city), a multi-version route such as one tied to a choose-your-own adventure game, and/or a Zombie Run or other point-to-point conditionality game/route.

In still other cases, location-based rules can use location type data indicating a type of geographic location proximate the audio device 10. In these cases, the AR audio engine 240 is configured to receive data about a type of geographic location proximate the audio device 10, and when that data satisfies the geographic location type condition, control release of audio notifications 265 (e.g., delay and/or re-order release of received notifications). In some cases, the user can designate particular notifications for release or delay, or categories of notifications for release or delay based upon the indicated type of geographic location. For example, the user can designate particular notifications from applications 260 as lower-priority for greenspace-type locations (e.g., parks, fields, etc.), and designate distinct notifications from applications 260 for urban locations (e.g., city streets). The user can designate notification rules according to activities associated with particular location types, for example, the user may associate greenspaces with yoga or meditation, and designate a rule that lower-priority or nuisance-type notifications (e.g., from a social media application or particular contacts in an email application) are delayed for such locations. In the example of urban locations, the user may prefer to hear navigation-based notifications from a navigation application or shopping/dining/nightlife recommendations from an entertainment application when walking through city streets.

In still other examples, location-based rules can be useful in industrial applications. For example, the AR audio engine 240 can be configured to receive data about a type of geographic location or a designation of the geographic location proximate the audio device 10, and when that data satisfies the geographic location type/designation condition, control release of audio notifications 265 (e.g., delay and/or re-order release of received notifications). In some cases, geographic locations can be designated (e.g., by a workplace management application) in categories such as hazardous (do not enter), moderately hazardous (e.g., double hearing protection zone), or safe (no additional precautions needed). In various implementations, these designations can be dynamically adjusted based upon conditions detected by the workplace management application, or by any other application connected with the AR audio engine 240. Particular notifications can be delayed and/or reordered based upon these location types and/or designations. For example, notifications about suggested hearing protection that are triggered based upon detecting the user approaching a moderately hazardous location can delayed or lowered in priority relative to notifications about communications from a superior. In contrast, notifications about the user approaching a hazardous location can be prioritized over all other notifications, and can de-prioritize or delay the notifications about communications from a superior.

II) Orientation of the audio device 10. In various implementations, the AR audio notification rules partially rely upon a known orientation of the audio device 10, which can suggest the orientation of the user of that device 10, e.g., the look direction of the user. In certain cases, the rules are connected with a particular orientation, such as looking up, down, left, right, etc. In some examples, the AR audio engine 240 is configured to determine that the user is looking up (e.g., while at his/her office, or while standing at a landmark of interest), and delay audio notifications from sources unrelated to the office (e.g., social media application notifications or personal phone call notifications) or the landmark of interest. The orientation-based rules can also be useful where it is determined based upon other inputs (e.g., calendar data, geographic location data, etc.) that the user is engaged in an activity that requires heightened attention. For example, the orientation-based rules can be paired with a geographic location-based rule and/or a task-based rule to control release of audio notifications 265 from distinct applications 260. In particular cases, the AR audio engine 240 can detect that the user is performing a task at a workstation that requires heightened attention, e.g., with location data indicating his/her physical location (and possibly, elevation), biometric data indicating that his/her eyes are focused in a particular direction and/or orientation data indicating that his/her look direction has not changed over a period, and suspend all notifications 265 until detecting that the task is paused or completed (e.g., where the user changes his/her look direction and/or location). In some variations of these cases, only high-priority notifications 265 are released when it is determined that the user is performing a focus-intensive task, e.g., messages from the user's supervisor via a messaging application or urgent phone calls via the audio gateway 210.

III) Relative proximity of the audio device 10 to another audio device. In some cases, proximity is determined by relative location data indicating the audio device 10 is proximate to a plurality of additional audio devices associated with corresponding users (e.g., executing a common application on the audio device 10 or audio gateway 210). In these cases, while location is relevant to controlling notification rules, it is relative location and not specific geographic location that dictates the nature of the notification rules. For example, the AR audio engine 240 can be configured to receive data from one or more additional audio devices (similar to audio device 10, FIGS. 1 and 2) that are in communication with the audio device 10 about the proximity of those additional devices in a given perimeter. In some cases, the AR audio engine 240 detects that the additional audio devices are within a certain radius (e.g., using BLE connection availability), or that the additional audio devices are on a shared local connection (e.g., a Wi-Fi network) that implies proximity. In particular implementations, the AR audio engine 240 is configured to release notifications about the proximate additional users (e.g., from a commonly run application such as a social media application or messaging application) only in response to detecting a threshold number of additional users are within a threshold proximity of the audio device 10. In these cases, the AR audio engine 240 can enhance the social aspects of the audio device 10 by enabling a few or more people to participate in communications, games, or other collaborative events. In various implementations, the AR audio engine 240 is configured to analyze potential connections from proximate devices (e.g., within BLE communication range, Wi-Fi range, or other geographic perimeter as defined by location-based application(s)), and in response to detecting that a threshold number of additional users (e.g., two or more) running a common application on their devices are within this range, can release notifications from that application, e.g., to initiate communication/interaction with these additional users. For example, the AR audio engine 240 can release an audio notification 265 such as: "There are multiple additional service technicians located in this area right now; would you like to initiate a chat?" or "Several people in this area are actively using Dating Application X, would you like to initiate a group date to break the ice?". In various implementations, logic in the application (e.g., AR audio engine 240) controls the release of these notifications between a plurality of audio devices associated with different users. In various implementations, the application running at a server (e.g., cloud-based server) can identify users within a geographic perimeter, based upon relative location, in order to enable communications, games, collaborative events, etc.

In still further implementations, detected relative proximity can be used to prompt the user to initiate peer-to-peer (P2P) communication with an additional user based upon that detection. While this process can be similar to the group communication/gaming/social interaction described herein, in this case, P2P communication is enabled between only two users. In these cases, the AR audio engine 240 need only detect that an additional user running the common application (e.g., social media application, gaming application, messaging application, etc.) on his/her device(s) is within P2P communication range, and after making that determination, releases an audio notification 265 at the audio device 10 to prompt the user regarding this potential connection. For example, the AR audio engine 240 can detect the proximity of the additional user (e.g., via range finding P2P functions such as BLE range, near-field ID range, RFID range), and release a notification 265 for playback at the audio device 10, such as: "Would you like to establish a P2P connection with nearby user Maya, who is in this workspace right now?"

IV) A detected biometric indicator about the user of the audio device 10. In these cases, biometric indicators can be detected by the sensor system 36, e.g., one or more biometric sensors. In various implementations, the AR audio engine 240 is configured to delay or otherwise re-prioritize audio notifications 265 based upon detected biometric indicator(s) about the user. In some cases, the biometric indicators can provide information about the user's stress level, focus level, activity level, etc., which can be useful in controlling release of notifications 265 from applications 260. In particular examples, rules can define biometric indicator thresholds for delaying or otherwise re-prioritizing release of notifications 265. For example, notifications 265 from applications 260 such as social media applications or shopping applications can be de-prioritized (e.g., delayed and/or released after a later-received notification) when the AR audio engine 240 detects a biometric indicator (e.g., heart rate or ECG reading) that reflects the user is stressed. In other cases, notifications 265 from a health tracking application can be prioritized over earlier-received notifications from distinct applications, and/or immediately released, when the AR audio engine 240 detects a biometric indicator (e.g., heart rate or ECG reading) that reflects the user is stressed. In other examples, the user can define audio notification rules to prevent notifications such as messaging notifications or phone call notifications from particular sources (e.g., other users) when the AR audio engine detects a biometric indicator that reflects the user is relaxed.

V) A task list for the user of the audio device 10. In additional implementations, audio notification rules can be defined at least in part based upon a detected task list for the user of the audio device 10. These audio notification rules may rely upon data from a calendaring application and/or a workflow application such as those commonly used in work environments to manage employee schedules and/or task completion. For example, the AR audio engine 240 can be configured to detect a task list for the user of the audio device 10 from a workflow application, and apply a set of audio notification rules based upon that task list. Where the task list indicates that the user is in the middle of a task, the AR audio engine 240 can delay all audio notifications 265 until that task is completed (e.g., as indicated by the workflow application or the end of a period assigned to the task). In additional cases, the AR audio engine 240 can release only high-priority notifications or notifications relevant to the task prior to completion of the task (e.g., an urgent message from the user's supervisor from a messaging application or an update to the task instructions from the workflow application). As with other example audio notification rules described herein, the task list conditions can be combined with other conditions to define one or more rules, e.g., calendar data, location data and/or time-of-day can be used in conjunction with the task list to define audio notification rules.

VI) A current time of day. In some cases, the current time of day is determined using clock data. This clock data can be retrieved from a clock or timing mechanism at the audio device 10, audio gateway 210 and/or smart device 280, and as with any other data described with reference to the AR audio engine 240 herein, can be retrieved on-demand or on a periodic basis. In various implementations, the AR audio engine 240 is configured to delay and/or re-prioritize audio notifications 265 from distinct applications 260 based upon the indicated current time of day (from the received clock data). For example, the AR audio engine 240 can be configured to receive clock data from one or more systems, compare that clock data with a stored audio notification rule (e.g., including threshold(s)) for the user, and release or delay release of one or more audio notifications 265 based upon the time of day indicated by the clock data (e.g., morning, afternoon, evening, rush hour, dinner hour, etc.). In some examples, the user (or default settings at the AR audio engine 240) can define a notification rule for a particular time of day in order to prevent notifications 265 from particular sources (applications 260) at unwanted periods. In a particular example, the user can define an audio notification rule that delays notifications from applications such as social media applications or shopping applications during work hours (and days), e.g., between 8:00 AM and 5:00 PM. In another example, the audio notification rule can prioritize notifications at certain times of the day, e.g., prioritizing health tracking application notifications over messaging application notifications or news applications between 6:00 AM and 7:00 AM when a user typically exercises or eats breakfast.

Various additional examples of audio notification rules are possible, only some of which are further described herein. In some additional cases, the AR audio engine 240 can include rules for receiving notifications from applications running in the background state based upon current application execution data.

In particular cases, the AR audio engine 240 can include rules relating to a weather condition proximate the audio device 10 (e.g., as indicated by weather data from one or more sensors 36 and/or a weather application running on one of the system devices (e.g., audio device 10, audio gateway 210 and/or smart device 280)). Sensors 36 can include, for example, humidity sensors to detect humidity or rain, microphones to detect rain or sleet, or temperature sensors to detect ambient temperature. In any case, the AR audio engine 240 is configured to receive weather data about the weather condition proximate the audio device 10, and when that weather data indicates that an audio notification rule is satisfied, adjust playback of audio notifications 265. In some cases, the audio notification rule can be related to changes in weather condition, such that the AR audio engine 240 releases notifications related to weather conditions in response to detecting that a change in weather is presently occurring or is occurring in the near future (e.g., from a forecasting function in a weather application).

In still further cases, speed or acceleration data indicating a speed at which the audio device 10 is moving or a rate of acceleration for the audio device 10, can define audio notification rules. In these cases, the AR audio engine 240 can detect an approximate speed or rate of acceleration for the audio device 10, and when that speed/acceleration satisfies an audio notification rule, adjust release of the audio notification 265 (e.g., delay lower priority notifications and/or release higher priority notifications). Speed and/or acceleration can be detected using the sensors 36 described with respect to FIGS. 1 and 2, e.g., IMU, accelerometer(s), optical sensors, etc. In some particular examples, the audio notification rules can be used to enhance exercise or other fast-paced activity, and the AR audio engine 240 is configured to receive speed/acceleration data in order to initiate release of health-tracking notifications and/or personal training notifications from one or more related applications 260, and in some cases, delay release of notifications 265 from other non-urgent applications 260 such as social media applications, shopping applications, etc. For example, the AR audio engine 240 can be configured to receive data indicating that the audio device 10 is accelerating at equal to or greater than a threshold rate or maintaining a speed that is equal to or greater than a threshold speed, and delay release of notifications from social media applications, shopping applications, weather applications, etc. while prioritizing release of notifications from a personal training application or a health tracking application.

As noted herein, the AR audio engine 240 can manage notifications according to a plurality of rules along with various additional AR audio functions. For example, the AR audio engine 240 can enable one or more users to interact with one another via audio notifications at distinct times. In these cases, a user can leave (or "drop") an audio pin for another user to discover (play back) at a distinct time. One particular example can include a hospital worker (e.g., physician's assistant, nurse or physician) on rounds. When the user arrives at a patient's room wearing the audio device 10, the AR audio engine 240 detects the user's location and provides a notification 265 to the user that a health summary is available for that patient (e.g., from a hospital management application). In some cases, the user may hear the notification 265 and initiate audio playback of the health summary. The user can additionally use the AR audio engine 240 in order to record an audio summary of vital signs or other data (e.g., patient notes) as that data is collected, e.g., for storage by the hospital management application. The user can also request information via the AR audio engine 240 about a procedure or task (e.g., where the AR audio engine 240 accesses the procedure or task data from the hospital management application).

Additionally, the user can leave audio notifications 265 or other data for a subsequent user to discover when triggering that location, e.g., using an audio pin. In the example of a hospital setting, a worker can leave notifications 265 for a subsequent worker about a patient, for example where a nurse leaves a notification 265 for the nurse working the following shift (e.g., regarding patient vitals or symptoms), or a physician can leave a notification 265 for a nurse or physician's assistant (e.g., regarding a prescription that has been ordered, so that the nurse or physician's assistant can check the status of that prescription).

Additional AR Audio Functions

In various implementations, as described herein, one or more audio notifications 265 are released for playback at the audio device 10 after evaluation relative to the audio notification rules. In additional implementations, as shown optionally in the flow diagram of FIG. 3 (process 360), the AR audio engine 240 can also be configured to modify an audio playback characteristic of the audio notification(s) 265 based upon the audio notification rules. For example, modifying the audio playback characteristic of the audio notification(s) 265 can include at least one of: a) prepending a tone indicating the audio notification, b) adjusting a pitch of the audio notification, c) adjusting a spatialized audio characteristic of the audio notification, or d) initiating a haptic marker prior to playback of the audio notification. In these cases, modifying the audio playback characteristic can provide a contextual cue for the user about the notification 265. That is, particular types of notifications 265 can be assigned different playback characteristics in order to indicate the source and/or importance of those notifications 265.

For example, audio notifications 265 from a particular application 260 can be prepended with a particular tone indicating the source of the notification 265. Similarly, audio notifications of high or low relative importance can be prepended with a tone indicating that level of importance. Haptic markers can be used in conjunction with the prepended tone, or as an alternative to indicating a characteristic of the notification 265 and/or the source (e.g., the application 260). In some cases, haptic markers can include vibrations or pulses (e.g., in patterns) at the audio device 10 and/or the smart device 280 to differentiate notifications 265. In other cases, the pitch of the audio notification 265 can be adjusted to indicate the source (e.g., the type of application 260, or an identity of an originating messenger such as a contact). In still other cases, spatialized audio characteristics of the notification 265 can be adjusted based upon the audio notification rules. For example, particular types of notifications (e.g., high-importance notifications) can be presented in spatialized form as audio playback appearing to come from in front of the user. Other notifications (e.g., low-importance notifications) can be presented in spatialized form as audio playback appearing to come from behind the user.

In still other implementations, the control system 230 is configured to receive a user command defining a noise management feature of the audio device 10, and enable the noise management feature in response to the user command. In some cases, noise management features can include at least one of: aware mode (permitting ambient acoustic signals to pass through the transducers as though the user were not wearing the audio device 10), augmented hearing mode (enhancing ambient acoustic signals), ANR mode or CNC mode. In these cases, the user may turn on the noise management feature while the AR audio engine 240 is running.

In some additional implementations, the AR audio engine 240 is configured to control additional device functions at the audio device 10 in order to provide an immersive AR audio experience. For example, in some cases, the AR audio engine 240 is configured to activate a noise canceling function (e.g., via ANR circuit 26) on the audio device 10 during playback of the AR audio. In some cases, the AR audio engine 240 is configured to activate noise canceling functions based upon settings defined by the user or default settings for the AR audio engine 240. In these cases, the user can define settings (e.g., via profile 275, FIG. 2) for noise cancelling, such that he/she may request ANR for playback in an area where the ambient noise level exceeds a threshold, or where a particular type of audio is played back (e.g., task-based instructions, versus music, versus audio book, versus podcast). The AR audio engine 240 is configured to activate the ANR circuit 26 to cancel ambient noise according to these settings. Controllable Noise Cancelling (CNC) functions (e.g., adjusting the level of noise cancellation) can be similarly enabled from the user's perspective.

Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); U.S. patent application Ser. No. 16/289,932 ("Augmented Audio Development"); and U.S. patent application Ser. No. 16/289,940 ("Augmented Reality Audio Playback Control").

As described herein, the AR audio engine 240 can have the technical effect of managing audio notifications for a user, e.g., a user of an audio device 10 such as a wearable audio device. In various implementations, the AR audio engine 240 allows the audio device user to receive notifications according to one or more rules so as to limit unwanted notifications and prioritize more relevant notifications. As noted herein, the audio notifications 265 can be presented in a purely audio form, that is, as audio playback at transducers such as transducers 28 on the audio device 10. These audio notifications 265 can allow the user to receive information, perform tasks and make commands with his/her hands free and head up. That is, the user can be more aware of his/her surroundings as compared with conventional notification management protocols that rely upon managing notifications on a visual display or screen. The AR audio engine 240 can significantly enhance the user experience when compared with these conventional notification management protocols.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling playback of augmented reality (AR) audio from distinct applications at a wearable audio device, the method comprising:
   running a control application at the wearable audio device or a smart device connected with the wearable audio device, the control application running as a gateway for notifications from the distinct applications;
   releasing a first audio notification at the wearable audio device based upon a set of audio notification rules for the distinct applications; and
   releasing a second audio notification at the wearable audio device, after the first audio notification, based upon the set of audio notification rules,
   wherein the first audio notification is received from a first one of the distinct applications, and the second audio notification is received from a second one of the distinct applications,
   wherein the control application controls release of the first audio notification and the second audio notification based upon the set of audio notification rules, and
   wherein the audio notification rules are dictated by a task list for the user of the wearable audio device, wherein in response to the task list indicating that the user is in in the middle of a task, the control application: a) delays all audio notifications until the task is completed, or b) releases only high-priority notifications or notifications relevant to the task prior to completion of the task.

2. The method of claim 1, wherein the first application is independent of the second application, and wherein the first audio notification is received by the control application from the first application after the second audio notification is received by the control application from the second application.

3. The method of claim 1, further comprising modifying an audio playback characteristic of at least one of the first audio notification or the second audio notification based upon the set of audio notification rules,
   wherein modifying the audio playback characteristic of at least one of the first audio notification or the second audio notification comprises at least one of: prepending a tone indicating the audio notification, adjusting a pitch of the audio notification, or adjusting a spatialized audio characteristic of the audio notification,
   wherein modifying the audio playback characteristic of at least one of the first audio notification or the second audio notification provides a contextual cue for a user of the wearable audio device about the first audio notification or the second audio notification.

4. The method of claim 1, further comprising:
   receiving a user command defining a noise management feature of the wearable audio device; and
   enabling the noise management feature in response to the user command,
   wherein the noise management feature is enabled while the control application is running, and
   wherein the noise management feature comprises at least one of: aware mode, augmented hearing mode, active noise reduction (ANR) mode or controllable noise cancellation (CNC) mode.

5. The method of claim 1, wherein the set of audio notification rules comprises a hierarchical data structure indicating:
   a) one or more scenarios whereby an earlier received audio notification is released after a later received audio notification, or
   b) one or more scenarios whereby a received audio notification is released on a delay,
   wherein the control application checks the earlier received audio notification or the audio notification released on the delay iteratively or until the notification times out.

6. The method of claim 2, wherein the distinct applications are run in a background state at the wearable audio device or the smart device while the control application is running.

7. A wearable audio device comprising:
   an acoustic transducer having a sound-radiating surface for providing an audio output; and
   a control system coupled with the acoustic transducer, the control system configured to control playback of augmented reality (AR) audio from distinct applications at the acoustic transducer by performing actions comprising:
      running a control application as a gateway for notifications from the distinct applications;
      releasing a first audio notification as playback at the acoustic transducer based upon a set of audio notification rules for the distinct applications; and
      releasing a second audio notification as playback at the acoustic transducer, after the first audio notification, based upon the set of audio notification rules,
      wherein the first audio notification is received from a first one of the distinct applications, and the second audio notification is received from a second one of the distinct applications,
      wherein the control application controls release of the first audio notification and the second audio notification based upon the set of audio notification rules, and
      wherein the audio notification rules are dictated by a task list for the user of the wearable audio device, wherein in response to the task list indicating that the user is in in the middle of a task, the control application: a) delays all audio notifications until the task is completed, or b) releases only high-priority notifications or notifications relevant to the task prior to completion of the task.

8. The wearable audio device of claim 7, wherein the first application is independent of the second application, and wherein the first audio notification is received by the control application from the first application after the second audio notification is received by the control application from the second application, and
 wherein the distinct applications are run in a background state at the wearable audio device while the control application is running.

9. The wearable audio device of claim 7, wherein the control system is further configured to modify an audio playback characteristic of at least one of the first audio notification or the second audio notification based upon the set of audio notification rules,
 wherein modifying the audio playback characteristic of at least one of the first audio notification or the second audio notification comprises at least one of: prepending a tone indicating the audio notification, adjusting a pitch of the audio notification, or adjusting a spatialized audio characteristic of the audio notification,
 wherein modifying the audio playback characteristic of at least one of the first audio notification or the second audio notification provides a contextual cue for a user of the wearable audio device about the first audio notification or the second audio notification.

10. The wearable audio device of claim 7, wherein the control system is further configured to:
 receive a user command defining a noise management feature of the wearable audio device; and
 enable the noise management feature in response to the user command,
 wherein the noise management feature is enabled while the control application is running, and
 wherein the noise management feature comprises at least one of: aware mode, augmented hearing mode, active noise reduction (ANR) mode or controllable noise cancellation (CNC) mode.

11. The wearable audio device of claim 7, wherein the set of audio notification rules comprises a hierarchical data structure indicating:
 a) one or more scenarios whereby an earlier received audio notification is released after a later received audio notification, or
 b) one or more scenarios whereby a received audio notification is released on a delay,
 wherein the control application checks the earlier received audio notification or the audio notification released on the delay iteratively or until the notification times out.

12. The method of claim 1, wherein the audio notification rules are further dictated by the detected biometric indicator about the user of the wearable audio device, wherein the audio notification rules define biometric indicator thresholds for delaying or otherwise re-prioritizing release of notifications from the distinct applications.

13. The method of claim 3, wherein modifying the audio playback characteristic of at least one of the first audio notification or the second audio notification comprises prepending the tone indicating the audio notification.

14. The method of claim 3, wherein modifying the audio playback characteristic of at least one of the first audio notification or the second audio notification comprises adjusting the pitch of the audio notification.

15. The method of claim 3, wherein modifying the audio playback characteristic of at least one of the first audio notification or the second audio notification comprises adjusting the spatialized audio characteristic of the audio notification.

16. The wearable audio device of claim 7, wherein the audio notification rules are further dictated by:
 a detected biometric indicator about the user of the wearable audio device, wherein the audio notification rules define biometric indicator thresholds for delaying or otherwise re-prioritizing release of notifications from the distinct applications.

\* \* \* \* \*